Aug. 4, 1970  TAKESHI HOJO ET AL  3,522,736
GYROSCOPIC INSTRUMENT

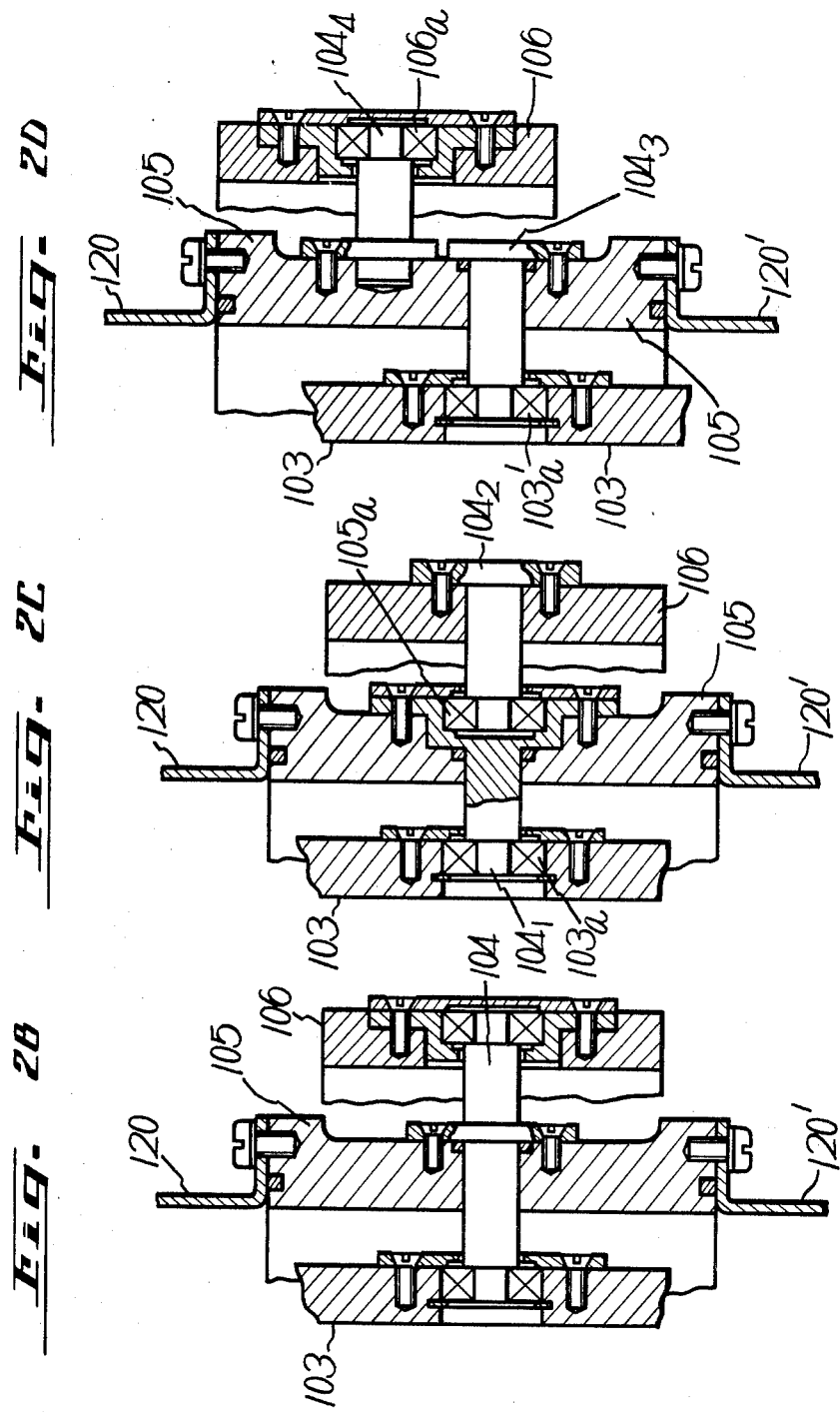

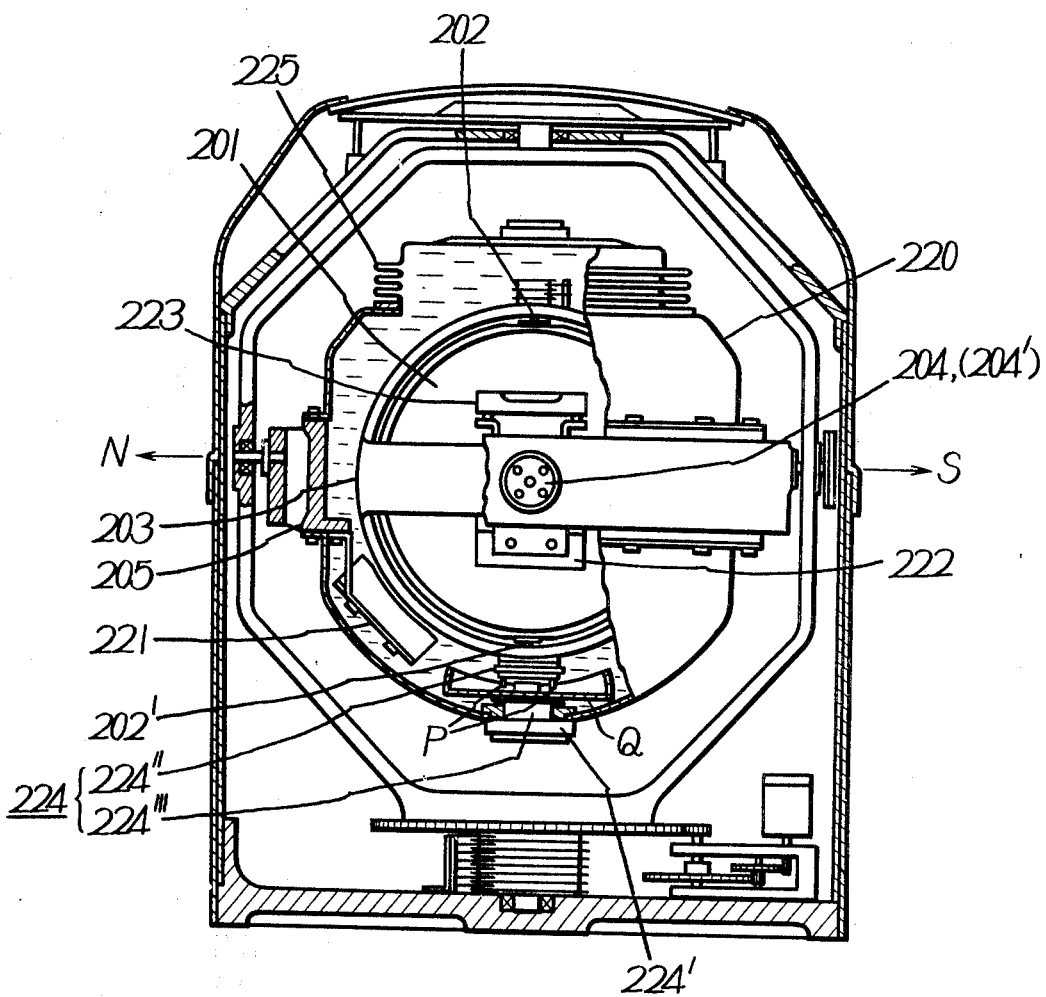

Filed May 6, 1968  5 Sheets-Sheet 5

INVENTORS
Tateshi Hojo
Shin-Ichi Kawada
Michio Fukano
BY Hill, Sherman, Meroni, Gross & Simpson ATTORNEYS United States Patent Office  3,522,736
Patented Aug. 4, 1970

3,522,736
GYROSCOPIC INSTRUMENT
Takeshi Hojo, Tokyo, and Shin-ichi Kawada and Michio Fukano, Yokohama-shi, Japan, assignors to Kabushiki-kaisha Tokyo Keiki Seizosho (Tokyo Keiki Seizosho Co., Ltd.), Tokyo, Japan, a corporation of Japan
Filed May 6, 1968, Ser. No. 726,837
Claims priority, application Japan, Oct. 3, 1967, 42/63,709
Int. Cl. G01c *19/14, 19/28*
U.S. Cl. 74—5                                5 Claims

ABSTRACT OF THE DISCLOSURE

A gyroscopic instrument having means for supporting a sealed gyro case with two degrees of freedom and a liquid container surrounding the gyro case. The liquid in the container produces buoyancy balancing with the weight of the gyro case. Horizontal support means are disposed on the outside of the container and means for detecting the deviation between the inner support means and the gyro.

BACKGROUND OF THE INVENTION

Field of the invention

This invention relates to a gyroscopic instrument, and more particularly to a novel gyroscopic instrument which is adapted so that a gyro case having incorporated therein a gyro rotor is supported in the manner of a float.

Description of the prior art

In conventional types of gyroscopic instruments a certain pair of horizontal shafts are subjected to the entire weights of a gyro case enclosing a rotor and inner vertical ring to cause an increase in rotational friction of the aforementioned horizontal shafts, which introduces lowering in the precision of the measurements by the instruments and necessitates regular maintenance of the instruments.

SUMMARY OF THE INVENTION

This invention is to provide a gyroscopic instrument having one portion constructed in the form of a tank containing a liquid for applying to the gyro case and so on buoyancy balancing with the weights thereof, thereby avoiding the drawbacks experienced in the prior art.

BRIEF DESCRIPTION OF THE DRAWINGS

FIG. 2B is an enlarged cross-sectional view of one portion of the instrument depicted in FIG. 2A;

FIGS. 2C and 2D are enlarged cross-sectional views showing other examples of this invention;

FIG. 3 is a similar perspective view illustrating another example of the gyroscopic instrument of this invention;

DESCRIPTION OF THE PREFERRED EMBODIMENTS

In order to facilitate a better understanding of the present invention, a description will be given first of one example of conventional types of gyroscopic instruments.

Figure 1:
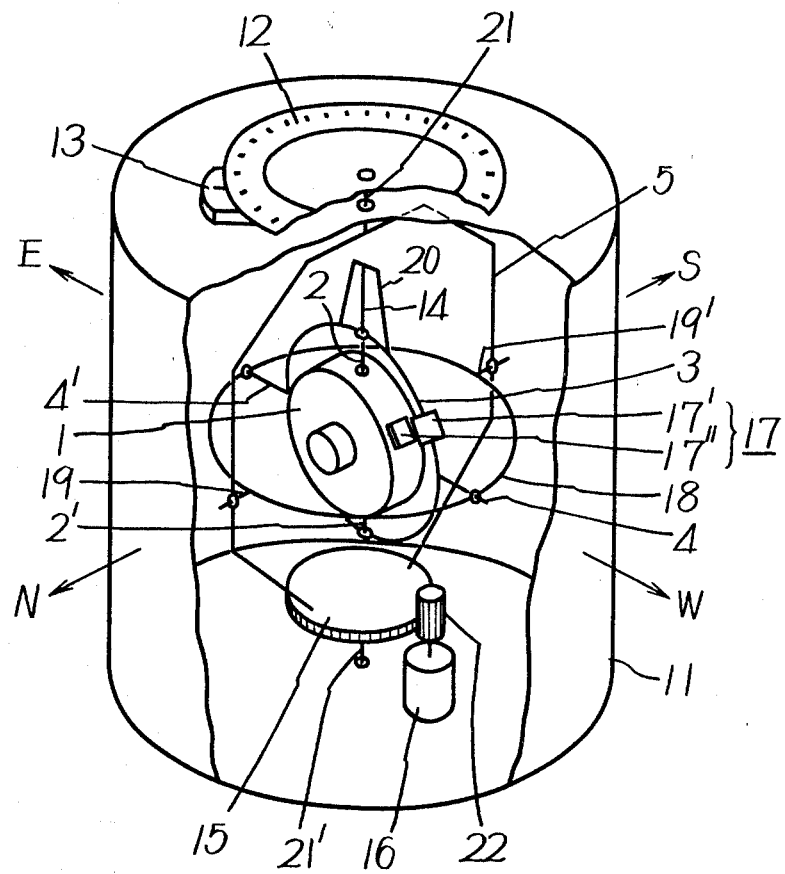
FIG. 1 is a perspective view illustrating one example of a prior art gyroscopic instrument, having one portion removed.

In FIG. 1 there is illustrated a prior art gyroscopic instrument, in which reference numeral 1 indicates a gyro case having incorporated therein a gyro rotor and having attached thereto at upper and lower positions a pair of vertical shafts 2 and 2'. The vertical shafts 2 and 2' are rotatably supported by a vertical ring 3. In this case, the gyro case 1 is suspended by, for example, a piano wire 14 secured at one end to a support member 20 provided on the vertical ring 3. The vertical ring 3 has attached thereto a pair of horizontal shafts 4 and 4', which are supported by a horizontal ring 18 in a rotatable manner, allowing free rotation of the vertical ring 3 about the horizontal axis coaxial with the horizontal shafts 4 and 4'. In addition, the horizontal ring 18 has attached thereto a pair of horizontal shafts 19 and 19' crossing the horizontal shafts 4 and 4' substantially at right angles thereto, which horizontal shafts 19 and 19' are respectively supported by a vertical ring 5 in a rotatable manner. The vertical ring 5 has attached thereto at top and bottom a pair of vertical shafts 21 and 21', which are rotatably attached to a binnacle 11. The binnacle 11 is fixedly mounted on a ship. Reference numerals 17' and 17'' respectively indicate deviation or displacement detecting elements mounted on the gyro case 1 and the vertical ring 3, which constitute noncontact type deviation detecting unit 17 for detecting the relative deviation of the gyro case to the vertical ring 3. Reference numeral 15 identifies a gear disc affixed to the vertical ring 5, and 16 a servo motor fixed to the binnacle 11. The servo motor 16 is driven by the output of the deviation detecting unit 17 and the rotation of the servo motor 16 is transmitted to the vertical ring 5 through a gear 22 affixed to the rotary shaft of the servo motor 16 and the gear disc 15 to rotate the vertical ring 5 relative to the binnacle 11 in a manner to reduce the relative deviation between the deviation detecting elements 17' and 17'' to zero, namely to eliminate torsion of the piano wire 14. Consequently, the vertical ring 5 always turns relative to the binnacle 11 following the gyro case 1 irrespective of the rotational displacement of the binnacle 11. In this sense the vertical ring 5 is referred to as a follow-up ring. A compass card 12 is affixed to the vertical shaft, for example, 21 of the follow-up ring 5 on the outside of the binnacle 11, while a pointer 13 is fixed on the binnacle 11. The relative rotational angle between the compass card 12 and the pointer 13 indicates the ship's heading.

The conventional gyroscopic instrument described above is defective in the following points. That is, in the case of the suspension wire type instrument exemplified in FIG. 1 the whole weight of the gyro case 1 and the vertical ring 3 is rendered directly to the horizontal shafts 4 and 4', causing an increase in the rotational friction of the horizontal shafts 4 and 4'. Consequently, it is desirable to minimize the load rendered to the horizontal shafts 4 and 4'. In addition to this, the prior art instrument necessitates lubrication of bearings of the vertical and horizontal shafts once a year or two.

Assuming that the suspension wire 14 is substituted with an oil tank adapted to serve as the vertical ring 3, too and the gyro case 1 is constructed in the form of a liquid-tight float for the purpose of eliminating the defects experienced in the conventional gyroscopic instrument described above, the problem of lubrication of the bearings of the vertical shafts is surely settled but other disadvantages remain unsettled. Further, where an oil tank is used to perform the function of the horizontal ring 18, the aforementioned drawbacks can be greatly avoided. However, this encounters with a problem such that when the binnacle 11 is caused to conduct angular movement about the horizontal shafts 4 and 4' owing to rolling and pitching of the ship, the gyro standing still substantially horizontal in the space is subjected to a disturbance torque due to viscosity of oil contained in the oil tank. Also in the case where the follow-up ring 5 is similarly constructed in the form of an oil tank, the results will be the same as in the case of the horizontal ring being of the oil tank structure, and a large quantity of oil is required for floating the elements enclosed in the tank.

In view of the various drawbacks encountered in the prior art such as mentioned above, the present invention is to provide a novel gyroscopic instrument which is free from all the defects set forth above.

Figure 2A:
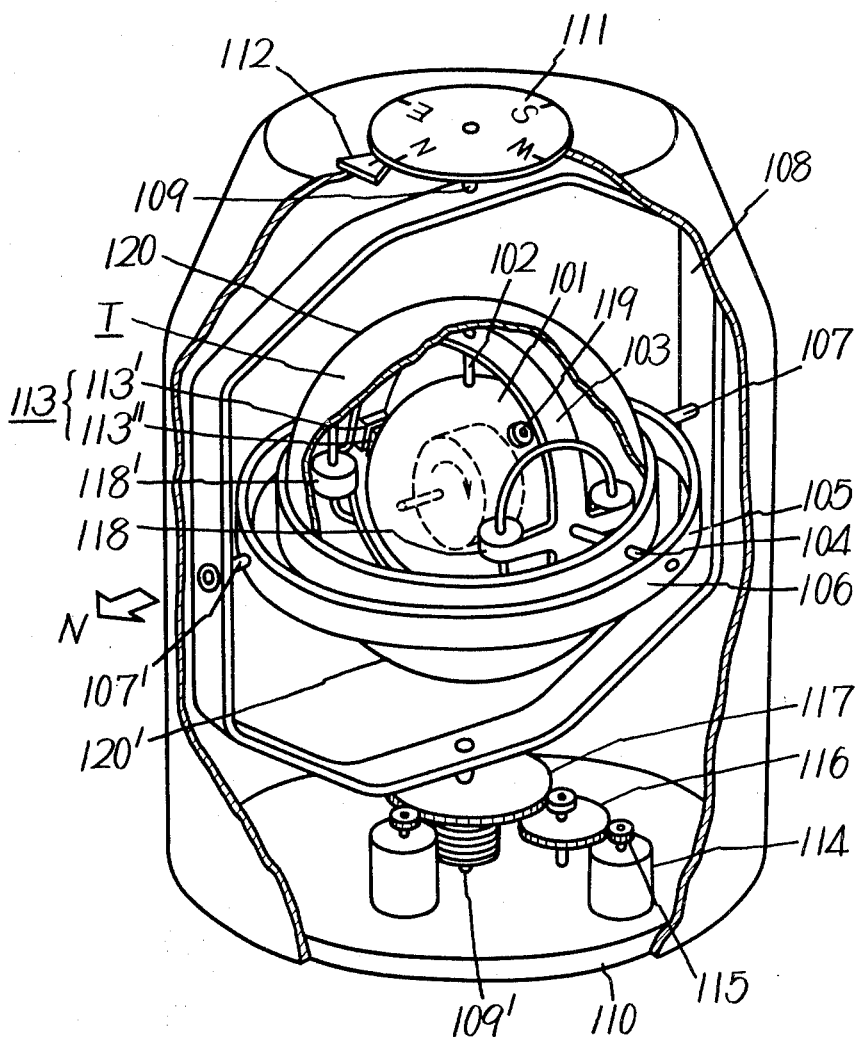
FIG. 2A is a perspective view, similar to FIG. 1, showing one example of a gyroscopic instrument produced according to this invention, with one portion being removed.

In FIG. 2A there is illustrated, by way of example, a gyroscopic instrument produced according to this invention. Reference numeral 101 indicates a gyro case having enclosed therein a gyro rotor revolving at high speed, and the gyro case 101 is formed liquid-tight to have the function of a float. Reference numerals 102 and 102' designate vertical shafts mounted on the top and bottom of the gyro case 101 although the vertical shaft 102' is not shown in the figure. These vertical shafts 102 and 102' are rotatably supported by a vertical ring 103 through the use of a pair of bearings provided at the top and bottom of the ring 103, though not shown. The vertical ring 103 has provided therein another pair of bearings at places spaced apart an angular distance of 90° from the aforementioned bearings for the vertical shafts 102 and 102', by means of which the inner ends of a pair of horizontal shafts 104 and 104' secured to an inner horizontal ring 105 disposed outside of the vertical ring 103 are rotatably supported. The horizontal shaft 104' is provided at a position diametrically opposite to the shaft 104, though not illustrated. On the inside of the inner horizontal ring 105 hemispherical shell-like covers 120 and 120' are attached thereto in a liquid-tight manner, thus constituting an oil tank T, as depicted in FIG. 2A. The oil tank T has enclosed therein a liquid such, for example, as commercially known under the name of "Daifloil" which applies to the gyro case 101 buoyancy balancing with its weight. Under such conditions, the tank T is heavy at its lower portion with respect to the horizontal shafts 104 and 104' and consequently constitutes a physical pendulum. The horizontal shafts 104 and 104' project at one end outwards of the inner horizontal ring 105 and are rotatably supported by an outer horizontal ring 106 through bearings provided therein. The outer horizontal ring 106 has embedded therein a pair of gimbal shaft bearings at places spaced apart angular distances of 90° from those for supporting the aforementioned horizontal shafts 104 and 104', and a pair of gimbal shafts (horizontal shafts) 107 and 107' affixed to a follow-up ring 108 are rotatably supported by the bearings mentioned just above. The follow-up ring 108 has attached thereto a pair of follow-up shafts 109 and 109' at locations spaced apart angular distances of 90° from the aforementioned gimbal shafts 107 and 107', and these shafts 109 and 109' are rotatably supported by bearings provided in the binnacle 110 at places corresponding to them. The binnacle 110 is fixed on, for example, a ship or the like. Reference numeral 111 indicates a compass card, which is attached to the aforementioned follow-up shaft, for instance, 109 and is disposed on the outside of the binnacle 110. Reference numeral 112 designates a pointer secured to the binnacle 110. The azimuth of, for example, a ship with the compass mounted thereon can be read out from the compass card 111 and the pointer 112. The vertical ring 103 and the gyro case 101 have respectively mounted thereon deviation detecting elements 113' and 113" at places corresponding to each other, which elements constitute a noncontact type relative deviation or displacement detecting unit 113 for detecting the relative deviation between the gyro case 101 and the vertical ring 103. While, a servomotor 114 is disposed on the bottom of the binnacle 110. When a deviation occurs between the vertical ring 103 and the gyro case 101, the servomotor 114 is driven by, for example, an electrical signal produced by the deviation detecting unit 113 in response to the deviation. The rotation of the servomotor 114 is transmitted to an azimuth gear 117 secured to the follow-up shaft 109' of the follow-up ring 108 through a gear train 116 associated with a gear 115 mounted on the rotary shaft of the servomotor 114, by which the vertical ring 103 is turned through the shafts of the support rings so that the relative deviation between the gyro case 101 and the vertical ring 103 is always held zero irrespective of the movement of, for example, a ship equipped with a compass. The vertical ring 103 is provided with known liquid ballistics 118 and 118' which cause the gyro to perform the north-seeking action.

On the peripheral surface of the gyro case 101 at one section substantially on the west a damping weight 119 is mounted in a plane crossing the spin axis of the gyro rotor enclosed in the gyro case at right angles thereto and including the vertical shafts 102 and 102'. Since it is based upon the same principles as those of known gyrocompasses that the spin axis of the gyro comes to rest along the meridian after a certain period of time by the action of the ballistics 118 and 118' and the damping weight 119, no detailed description will be given for the sake of brevity.

As has been described in the foregoing, in the present invention the inner horizontal ring 105 is positioned between outer horizontal ring 106 and the vertical ring 103 corresponding to the horizontal ring 18 and the vertical ring 3 of the conventional gyroscopic instrument such as depicted in FIG. 1, and the hemispherical shell-like covers 120 and 120' are assembled with the inner horizontal ring 105 in a liquid-tight manner to constitute the oil tank T. The lower portion of the oil tank T is made heavy relative to the horizontal shafts 104 and 104' to provide the oil tank T as a physical pendulum. With such an arrangement, even if the binnacle 110 is inclined about the horizontal shafts 104 and 104' by angular movements of the ship such as rolling, pitching and so on, the inner horizontal ring 105 can be held substantially horizontal by the function of the physical pendulum performed by the oil tank T thereby to prevent generation of relative angular deviations between the gyro case 101 and the inner horizontal ring 105. This naturally leads to almost complete elimination of the relative angular velocity therebetween. Consequently, when the binnacle 110 is inclined owing to rolling and pitching of the ship, no disturbance torque due to the viscosity of the liquid is applied to the gyro case, which results in avoidance of deterioration of the precision of the gyro due to such disturbance torque. Further, the bearings for the vertical and horizontal shafts can be maintained lubricous almost semipermananently by the use of a lubricative liquid as the liquid enclosed in the oil tank T. The oil tank T is adapted such that the weight of the gyro case 101, which is the heaviest of all the elements in the oil tank T, balances with the buoyancy owing to the liquid and consequently one portion of the weight of the vertical ring 103 is also cancelled by the buoyancy of the liquid, and this extremely decreases radial load rendered to the bearings for the horizontal shafts and hence greatly improves the characteristics of the bearing. That is, the present invention eliminates the drawbacks encountered in the conventional gyroscopic instrument described above to provide for remarkedly enhanced precision of the gyroscopic instrument.

FIGS. 2A and 2B illustrate examples in which each of the horizontal shafts 104 and 104' is one shaft passed through the inner horizontal ring 105, but it need not be always one shaft and may be formed of two.

FIGS. 2C and 2D similarly illustrate other examples of the horizontal shafts 104 and 104'. In FIG. 2C the horizontal shaft 104 or 104' consists of two shafts $104_1$ and $104_2$ disposed coaxially, in which case the shaft $104_1$ is fixed at one end to the inner horizontal ring 105 and is rotatably received at the other end by a bearing 103a provided in the vertical ring 103 and the other shaft $104_2$ is rotatably supported at one end by a bearing 105a provided in the inner horizontal ring 105 and is fixed at the other end to the outer horizontal ring 106.

FIG. 2D shows an example in which the shafts 104 and 104' are each formed of two shafts $104_3$ and $104_4$, and these shafts are not aligned coaxially. The shaft $104_3$ is rotatably supported at one end by a bearing 103a' provided in the vertical ring 103 and is fixed at the other end to the inner horizontal ring 105, while the other shaft $104_4$ is fixed at one end to the inner horizontal ring 105 and is rotatably supported at the other end by a bearing 106a provided in the outer horizontal ring 106.

In FIG. 3 there is illustrated another embodiment of this invention, which is substantially similar to that exemplified in FIG. 2 except in the following points. Namely, the liquid ballistics 118 and 118' and the damping weight 119 in the example depicted in FIG. 2 are substituted with electrical means for serving the same purposes. A detailed description will hereinbelow be given of the present embodiment. As shown in the figure, an accelerometer 223 having a sensitive direction parallel with the spin axis of the gyro rotor is rigidly secured to a vertical ring 203 identical with that shown in FIG. 2A, the spin axis of the gyro rotor being indicated by N and S. The accelerometer 223 is adapted so that its output responds to the tilt of the vertical ring 203, namely, the tilt of a gyro case 201 about horizontal shafts 204 and 204'. Meanwhile, an inner horizontal ring 205 has provided thereon an azimuth torquer 221, which is actuated by the output of the accelerometer 223 and cooperates with the vertical ring 203 to apply a torque to the gyro case 201 about the horizontal shafts 204 and 204' in a noncontact manner. Namely, a torque proportional to the tilt angle of the spin axis of the gyro rotor relative to the horizontal plane is applied to the gyro case about the horizontal shafts thereof by the accelerometer 223 and the azimuth torquer 221. In this manner, the accelerometer 223 and the azimuth torquer 221 perform the same function as the liquid ballistics 118 and 118' depicted in FIG. 2A.

Further, a levelling torquer 222 is mounted on the vertical ring 203 which is actuated by the output of the accelerometer 223 to cooperate with the gyro case 201 to apply about the vertical shafts 202 and 202' of the gyro case 201 a torque in proportion to the inclination of the spin axis of the gyro relative to the horizontal plane. That is, the accelerometer 223 and the levelling torquer 222 have the same function as the damping weight 119 shown in FIG. 2. Reference numeral 225 identifies bellows provided on the cover 220, which serve to avoid the influence of the variations in the volume of the liquid contained in the covers 220 and 220'. Hemispherical shell-like covers 220 and 220' similar to those 120 and 120' depicted in FIG. 2A are likewise assembled with an inner horizontal ring 205. To the underside of the lower cover 220' there is firmly attached a clamp device 224 for protecting the internal mechanisms such as the gyro case 201, the vertical ring 203 and so on from external shocks when the gyro rotor is at a standstill or the gyroscopic instrument is transported for repair, installation or the like. The clamp device 224 consists of a clamp member 224'' having a pair of pins P fixed to the vertical ring 203 and another clamp member 224'' positioned at a place corresponding to the aforementioned one 224''' and having a substantially rectangular box-shaped engaging member Q engageable with the pins P attached to the cover 220' and a knob 224' for turning the engaging member Q. In FIG. 3 the pins P and the engaging member Q are illustrated in their disengaged position. Accordingly, in this case the vertical ring 203 is rotatable about the horizontal shafts 204 and 204'. If now the knob 224' is turned about 90°, the engaging member Q is turned to a position indicated by broken lines in FIG. 4, in which case the interior surfaces of a pair of opposed side walls $S_1$ and $S_2$ of the engaging member Q are urged into engagement with the pins P, to prevent rotation of the vertical ring 203 about the horizontal shafts 204 and 204'. With the vertical ring 203 clamped as described above during transportation, repair or stoppage of the gyroscopic instrument, the gyro can be protected from external shocks.

Figure 4:
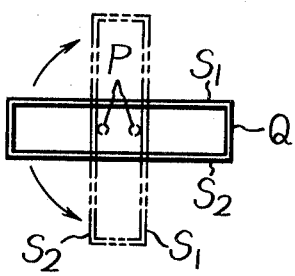
FIG. 4 is an enlarged plan view showing one example of a clamp device according to this invention.

The same results can be obtained by respectively attaching the clamp devices such as depicted in FIGS. 3 and 4 to the gyro case and the vertical ring 203 in a manner to fix the gyro case.

Figure 5:
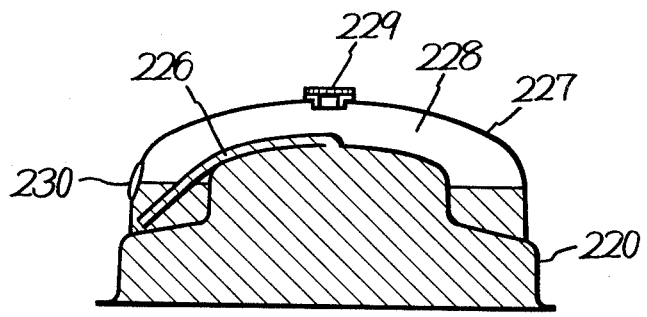
FIG. 5 is an enlarged view of one portion of still another example of this invention.

FIG. 5 schematically illustrates a device performing the same function as the bellows 225 exemplified in FIG. 3. In this case, a pipe 226 is attached to the top of a tank 220 and a cover 227 is mounted on the tank 220 over its upper portion in a liquid-tight manner and the pipe 226, to provide an air chamber 228 between the cover 227 and the tank 220. A filter or an aperture 229 is provided in the cover 227 at its top to allow communication of the air chamber 28 with the outside. Further, a window 230 may be provided in the cover 227 for observing the condition in the chamber 28, if necessary.

With the above arrangement, the liquid contained in the tank may freely flow in and out of the air chamber 228, thus ensuring that the pressure of the tank 220 due to liquid is always held substantially constant.

It will be apparent that many modifications and variations may be effected without departing from the scope of the novel concepts of this invention.

We claim as our invention:

1. A gyroscopic instrument comprising: a liquid-type gyro case having incorporated therein a gyro rotor, a pair of vertical shafts attached to the gyro case, said vertical shafts being perpendicular to the spin axis of the gyro rotor, a first supporting means including a vertical ring disposed outside the gyro case for supporting said pair of vertical shafts, a pair of first horizontal shafts attached to the first supporting means, said first horizontal shafts being perpendicular to both the spin axis and said vertical shafts, a second supporting means disposed outside said vertical ring for rotatably supporting said first horizontal shafts, said second supporting means being a liquid container, a liquid within said second supporting means for generating buoyancy substantially balancing with the weight of the gyro case, second horizontal shafts fixed to said second supporting means in parallel with the first horizontal shafts, a third supporting means disposed outside said second supporting means for rotatably supporting said second horizontal shafts, and a detecting means comprising portions respectively attached to said gyro case and to said first supporting means for cooperably detecting the relative angular deviation between said first supporting means and the said gyro case around said vertical shafts.

2. A gyroscopic instrument as claimed in claim 1, comprising a movable means attached to said second supporting means and a member attached to said gyro case and cooperably engageable with said movable means for clamping said gyro to said second supporting means.

3. A gyroscopic instrument as claimed in claim 1 wherein said second supporting means includes bellows means for absorbing variations in pressure of said liquid to thereby prevent breakage of said second supporting means.

4. A gyroscopic instrument as claimed in claim 1, wherein said second supporting means includes a liquid chamber for containing said liquid, an air chamber, and a fluid passageway connecting said liquid chamber and said air chamber in communication for absorbing variations of pressure of said liquid to thereby prevent breakage of said second supporting means.

5. A gyrocompass comprising: a liquid-type gyro case having incorporated therein a gyro rotor, a pair of vertical shafts attached to said gyro case, said vertical shafts disposed perpendicular to the spin axis of said gyro rotor, a first supporting means including a vertical ring disposed outside said gyro case for supporting said pair of vertical shafts, a pair of first horizontal shafts attached to said first supporting means, said first horizontal shafts being perpendicular to both the spin axis and said vertical shafts, a second supporting means disposed outside said first supporting means for rotatably supporting said first horizontal shafts, said second supporting means being a liquid container including a liquid therein for generating buoyancy substantially balancing the weight of said gyro case, said second horizontal shafts fixed to said second supporting means in parallel with said first horizontal shafts, a third supporting means disposed outside said second supporting means for rotatably supporting said second horizontal shafts, detecting means comprising separate portions respectively attached to said gyro case and to said first supporting means for cooperably detecting the relative angular deviation between said first supporting means and said gyro case about said vertical shafts, indicating means coupled to said first supporting means by way of said second and third supporting means for indicating said relative angular deviations, and means connected between said detecting means and said third supporting means for applying a correcting torque to said third supporting means.

References Cited

UNITED STATES PATENTS

| | | | |
|---|---|---|---|
| 2,650,502 | 9/1953 | Lundberg et al. | 74—5 |
| 2,740,299 | 4/1956 | Jewell | 74—5 |
| 2,785,573 | 3/1957 | Bentley | 74—5 |
| 2,809,526 | 10/1957 | Lundberg | 74—5 |
| 3,044,309 | 7/1962 | Buchhold | 74—5 |
| 3,273,340 | 9/1966 | Ehrich | 74—5 |

FRED C. MATTERN, Jr., Primary Examiner

M. A. ANTONAKAS, Assistant Examiner

U.S. Cl. X.R.

33—226; 74—5.6